US011223556B2

(12) United States Patent
Magzimof et al.

(10) Patent No.: US 11,223,556 B2
(45) Date of Patent: Jan. 11, 2022

(54) PLATFORM FOR REDUNDANT WIRELESS COMMUNICATIONS OPTIMIZATION

(71) Applicant: Phantom Auto Inc., Mountain View, CA (US)

(72) Inventors: Shay Magzimof, Palo Alto, CA (US); David Parunakian, Moscow (RU); Yuval Deri, Petach Tikva (IL); Gleb Mezhanskiy, San Francisco, CA (US)

(73) Assignee: Phantom Auto Inc., Mountain View, CA (US)

( * ) Notice: Subject to any disclaimer, the term of this patent is extended or adjusted under 35 U.S.C. 154(b) by 0 days.

(21) Appl. No.: 16/892,264

(22) Filed: Jun. 3, 2020

(65) Prior Publication Data

US 2020/0389387 A1 Dec. 10, 2020

Related U.S. Application Data

(60) Provisional application No. 62/857,265, filed on Jun. 4, 2019.

(51) Int. Cl.
*H04W 28/06* (2009.01)
*H04L 12/707* (2013.01)
(Continued)

(52) U.S. Cl.
CPC .............. *H04L 45/24* (2013.01); *H04L 45/16* (2013.01); *H04W 28/0236* (2013.01); *H04W 28/06* (2013.01)

(58) Field of Classification Search
CPC ......... H04L 45/16; H04L 45/24; H04L 45/30; H04L 45/302; H04L 45/306;
(Continued)

(56) References Cited

U.S. PATENT DOCUMENTS 9,806,988 B2 * 10/2017 Kaplan .................. H04L 29/06
10,234,538 B1 * 3/2019 Fortney ................. H04W 4/025
(Continued)

FOREIGN PATENT DOCUMENTS

JP 2009-284149 A 12/2009
WO WO 2012/013637 A1 2/2012

OTHER PUBLICATIONS

United States Office Action, U.S. Appl. No. 16/862,513, dated Apr. 8, 2021, 16 pages.
(Continued)

*Primary Examiner* — Kevin D Mew
(74) *Attorney, Agent, or Firm* — Fenwick & West LLP

(57) ABSTRACT

A communication system facilities low-latency, high-availability multipath streaming between terminals (e.g., mobile terminals) and a server platform. In an example application, a remote support service operating on the server platform provides remote teleoperation, monitoring, or data processing services to a mobile terminal embodied as a vehicle or robot utilizing a low latency communication link. The low latency link enables a remote operator to receive video or telemetry feeds, and timely monitor and respond to hazards in substantially real-time. The low latency communication link may be achieved even when the data streams are transmitted over public networks incorporating at least one wireless leg, and where individual connections have varying quality of service in terms of delivery latency due to congestion or stochastic packet losses. Assignment of data streams to particular communication channels may be made on an optimization model derived from a machine-learning process or simulation.

23 Claims, 8 Drawing Sheets

(51) Int. Cl.
  *H04L 12/761* (2013.01)
  *H04W 28/02* (2009.01)
(58) Field of Classification Search
  CPC ...... H04L 45/308; H04L 45/38; H04W 28/02; H04W 28/0205; H04W 28/0226; H04W 28/0231; H04W 28/0236; H04W 28/0242; H04W 28/0247; H04W 28/06
  See application file for complete search history.

(56) References Cited

U.S. PATENT DOCUMENTS

| | | | |
|---|---|---|---|
| 2010/0033622 A1 | 2/2010 | Bellers et al. | |
| 2012/0013637 A1 | 1/2012 | Edwards et al. | |
| 2012/0137319 A1* | 5/2012 | Schooling | H04H 60/31 |
| | | | 725/16 |
| 2012/0180101 A1* | 7/2012 | Davis | H04N 21/2402 |
| | | | 725/116 |
| 2012/0317308 A1 | 12/2012 | Penner et al. | |
| 2012/0320916 A1* | 12/2012 | Sebastian | H04N 21/6375 |
| | | | 370/390 |
| 2013/0094522 A1* | 4/2013 | Moshfeghi | H04W 72/046 |
| | | | 370/498 |
| 2013/0133028 A1 | 5/2013 | Raleigh | |
| 2013/0246577 A1* | 9/2013 | Gonzales | H04L 65/80 |
| | | | 709/219 |
| 2014/0025648 A1 | 1/2014 | Corbett et al. | |
| 2015/0036536 A1* | 2/2015 | Kumar | H04L 45/06 |
| | | | 370/254 |
| 2015/0145944 A1 | 5/2015 | Stonefield et al. | |
| 2015/0201023 A1* | 7/2015 | Kotab | H04L 65/60 |
| | | | 709/208 |
| 2015/0271500 A1 | 9/2015 | Kouno et al. | |
| 2016/0066357 A1 | 3/2016 | Goldhamer | |
| 2016/0227017 A1* | 8/2016 | Kotab | H04W 4/40 |
| 2016/0323652 A1 | 11/2016 | Beals | |
| 2016/0381110 A1* | 12/2016 | Barnett | H04L 65/601 |
| | | | 709/231 |
| 2017/0048328 A1* | 2/2017 | Korotaev | H04L 69/16 |
| 2017/0251515 A1 | 8/2017 | Altman et al. | |
| 2018/0123963 A1 | 5/2018 | Thubert et al. | |
| 2018/0218073 A1* | 8/2018 | Wilshinsky | G06F 21/6209 |
| 2018/0227215 A1* | 8/2018 | Raponi | H04L 45/12 |
| 2019/0141545 A1 | 5/2019 | Dang et al. | |
| 2019/0364459 A1* | 11/2019 | Lee | H04W 40/22 |

OTHER PUBLICATIONS

Das, A.K. et al., "Optimization Models for Fixed Channel Assignment in Wireless Mesh Networks with Multiple Radios," IEEE, Oct. 2005, pp. 1-12.
Garcia-Roger, D. et al., "5G Functional Architecture and Signaling Enhancements to Support Path Management for eV2X," IEEE Access, vol. 7, Feb. 6, 2019, pp. 20484-20498.
PCT International Search Report and Written Opinion, PCT Application No. PCT/US20/36013, dated Sep. 8, 2020, 20 pages.
PCT International Search Report and Written Opinion, PCT Application No. PCT/US20/30568, dated Sep. 14, 2020, 21 pages.
PCT Invitation to Pay Additional Fees, PCT Application No. PCT/US20/30568, dated Jun. 25, 2020, three pages.

* cited by examiner

PLATFORM FOR REDUNDANT WIRELESS COMMUNICATIONS OPTIMIZATION

CROSS-REFERENCE TO RELATED APPLICATIONS

This application claims the benefit of U.S. Provisional Patent Application No. 62/857,265, filed on Jun. 4, 2019, the contents of which are incorporated by reference herein.

BACKGROUND

Technical Field

This disclosure relates generally to connected vehicles, and more specifically to a system and method for allowing programmatic customization of redundant data stream optimality criteria and automated clusterization of data streams according to similarity of projected optimal criteria.

Description of the Related Art

The explosive growth of wireless communications has created opportunities for a large variety of new technologies possessing different levels of demand for network bandwidth, data stream latency and channel reliability. While the evolution of cellular communication technology has brought forth complicated mathematical solutions for solving the challenging problem of sharing a common transmission medium between large numbers of subscribers and cellular nodes, and has led to the creation of vast and expensive infrastructure projects, developers of mobile application and Internet of Things (IoT) software are often agnostic to these complexities as they are resolved transparently on the operating system level. Usually such abstraction enables a higher pace of application development, although occasionally it introduces errors that are difficult to diagnose correctly and to debug.

Applications such as autonomous vehicle navigation systems have exceptional demands for communication reliability and latency while other considerations such as reduction of data costs or maximization of total throughput come a distant second. However, currently available networking solutions are rarely suitable for the case of highly mobile terminals such as autonomous vehicles, and are noticeably labor-intensive to set up and integrate with an application.

SUMMARY OF THE EMBODIMENTS

An orchestrator of a computing system such as a mobile terminal controls assignments of redundant data streams to wireless communication channels in which the assignments are optimized based on an optimization model. The orchestrator identifies a plurality of complementary sets of data streams, wherein the data streams within a complementary set represent redundant data from a common data source. The orchestrator obtains an optimization model for optimizing the assignments of data streams to the communication channels. The optimization model may optimize for latency, quality of service, or communication parameters. The optimization model enforces a constraint that data streams within a complementary set are assigned to at least two different wireless communication channels. The orchestrator performs an optimization based on the optimization model to determine the assignments and configures the mobile terminal to transmit the data streams over the communication channels in accordance with the assignments. The mobile terminal transmits the data streams over the wireless communication channels to a platform server.

In an embodiment, the orchestrator responds to changes in state of the terminal by updating the optimization to determine updated assignments, and re-configuring the terminal based on the updated assignments.

In an embodiment, the orchestrator responds to changes in parameters of the communication channels by updating the optimization to determine updated assignments, and re-configures the terminal based on the updated assignments.

In an embodiment, the optimization model is derived from a simulation of a mobile terminal moving through an environment and information describing available network infrastructure in the environment. The optimization model may be trained by applying a reinforcement learning model that trains the orchestrator on a dataset acquired from the simulation. For example, a reinforcement learning module may obtain geospatial information relating to objects along a route of the mobile terminal, obtain network infrastructure information relating to locations of wireless communication infrastructure along the route, perform the simulation of movement of the mobile terminal through the route and predicting wireless communication performance based on the geospatial information and the network infrastructure information, and store a mapping of the performance parameters to locations along the route based on the simulation.

In an embodiment, performing the optimization comprises generating a search graph with nodes representing a plurality of states of a mobile terminal and edges representing actions for transitioning between the states, computing a utility function that represents predicted wireless communication performance of the mobile terminal in each of the states, determining an optimized state of the mobile terminal that optimizes the utility function, and generating the assignments based on the optimized state.

In an embodiment, the orchestrator may obtain the optimization model based on a configuration received from the server platform via an application programming interface of the orchestrator.

DETAILED DESCRIPTION

A communication system facilities low-latency, high-availability multipath streaming between mobile terminals and a server platform. In an example application, a remote support service operating on the server platform provides remote teleoperation, monitoring, or data processing services to a mobile terminal embodied as a vehicle or robot utilizing a low latency communication link. The low latency link enables a remote operator to receive video or telemetry feeds, and timely monitor and respond to hazards in substantially real-time. The low latency communication link may be achieved even when the data streams are transmitted over public networks incorporating at least one wireless leg, and where individual connections have varying quality of service in terms of delivery latency due to congestion or stochastic packet losses.

In an embodiment, consistent low-latency data streaming over public wireless networks is achieved by utilizing multiple wireless paths and transmitting complementary data streams having redundant data from the source (e.g., a mobile terminal embodied in a vehicle or robot) to a receiving server. The server may operate as a proxy server to perform post-processing on these complementary streams by keeping track of data segments received and forwarding a selected copy of each new data segment to a destination server that may provide teleoperation or other remote support services. The communication system may be highly adaptable to changing network conditions as the mobile terminal changes position or as parameters affecting transmission quality vary to maintain a reliable low latency connection. In other embodiments, a similar multipath streaming architecture may be applied in communication systems where the originating terminal is not necessarily mobile (e.g., stationary security cameras).

Figure 1:
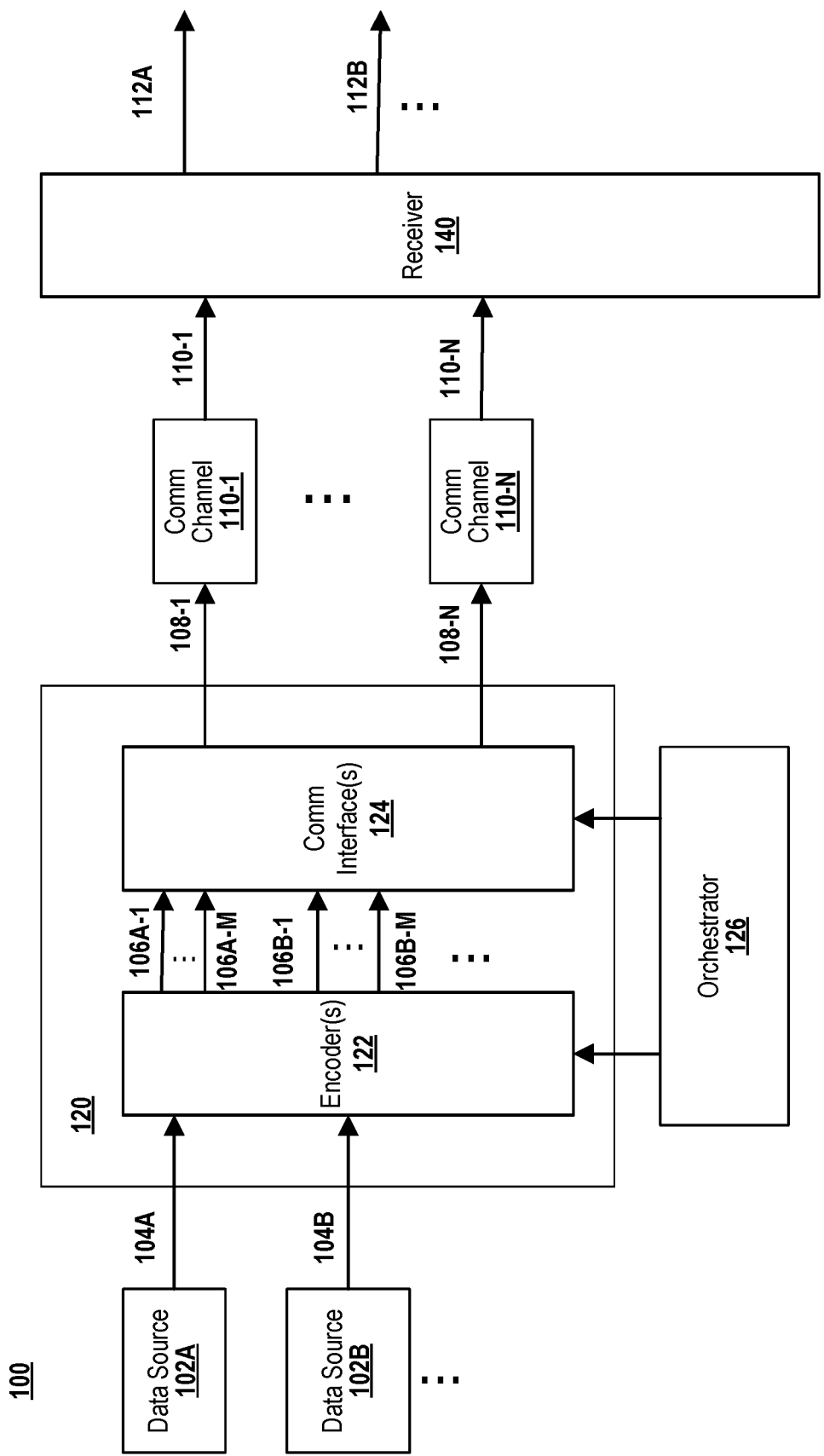
FIG. 1 is a block diagram illustrating an example embodiment of a redundant wireless communication system.

FIG. 1 illustrates an example embodiment of a communication system 100 for transmitting low latency communications from a transmitter 120 to a receiver 140. One or more data sources 102 (e.g., a first data source 102A, a second data source 102B, . . . ) generate respective data streams 104 (e.g., a first data stream 104A, a second data stream 104B, . . . ) for transmission. The data streams 104 may comprise, for example, video streams from respective video cameras, telemetry data streams related to sensor data (position data, motion data, temperature data, or other types of data), a control data stream providing control data, or other data. A set of one or more encoders 122 receives the data streams 104 and encodes the data streams 104 to generate respective sets of two or more complementary data streams 106 associated with the original data streams 104. For example, the encoders 122 encode a first data stream 104A from a first data source 102A to generate a first set of M complementary encoded data streams 106A (e.g., data streams 106A-1, . . . , 106A-M), encode a second data stream 104B from a second data source 102B to generate a second set of M complementary encoded data streams 106B (e.g., data streams 106B-1, . . . , 106B-M), and so on. Each set of complementary encoded data streams 106 may comprise direct duplicate streams of the respective original data stream 104, or may comprise a set of streams that are not direct duplicates but represent redundant data. For example, the set of complementary encoded data streams 106A may represent different encodings of the original data stream 104A that are encoded based on different encoding schemes or encoding parameters. The different encoded data streams 106A within the complementary set may therefore have different bit rates, different compression parameters, different quality parameters or other differences while still each representing redundant data from the same data source 102A.

An orchestrator 126 determines how to generate the sets of complementary data streams for each data source 102 and determines assignments of the encoded data streams 106 to specific communication channels 110 (e.g., communication 110-1, . . . , 110-N). The orchestrator 126 may configure an arbitrary number of complementary streams 106 for an individual original stream 104, depending on that data stream's resilience to network congestion and other events. In an embodiment, the orchestrator 126 assigns encoded data streams 106 to available communication channels 110 according to an optimization function that optimizes one or more parameters within a given set of constraints. The orchestrator 126 may generate assignments such that any encoded data streams 106 within the same complementary set (i.e., derived from the same original data stream 104) are assigned to different communication channels 110 so that redundant data derived from the same data source 102 is transmitted on different channels 110. In some cases, these assignments may comprise null assignments in which a particular encoded data stream 106 is not assigned to any of the communication channels 110. The orchestrator 126 may operate to distribute the encoded data streams 106 among the available communication channels 110 in a manner that minimizes the total unused bandwidth while maintaining low latency under these constraints. For example, the orchestrator 126 may determine the optimal solution based on various techniques including experimental mapping, simulation, application of a state space search algorithm, application of a neural network trained using reinforcement learning, or other techniques described in further detail below. In an embodiment, the orchestrator 126 may furthermore acquire network connection parameters indicative of performance of different communication channels 110 and adjust the encoding parameters or communication channel assignments accordingly.

In another embodiment, the total unused bandwidth subject to minimization is computed based on a predefined bandwidth budget that may not necessarily track the actual available bandwidth. For example, the bandwidth budget may be equal to the actual available bandwidth if the actual available bandwidth is less than 10 Mbps, and may plateau at a maximum value of 10 Mbps otherwise.

The communication interfaces 124 receive the encoded data streams 106 and output the encoded data streams 106 as a set of transmit signals 108 to the communication channels 110 in accordance with the assignments received from the orchestrator 126. The communication channels 110 may each at least partially include a wireless network comprising one or more of a cellular network, a WiFi network, low-Earth orbit (LEO) satellite network, a directional microwave radio beam connection, or any other wireless communication method or combination thereof. The different communication channels 110 may furthermore each differ in at least one respect such that transmission performance of the different communication channels 110 may vary. For example, the different communication channels 110 may utilize different types of networks or different combinations of network types, networks operated by different carriers, networks utilizing different network infrastructure, networks operating according to different network parameters, or networks having other differences that cause performance to vary from each other under different operating conditions. The networks utilized by the different communication channels 110 may at least partially overlap. For example, two or more of the communication channels may partially share part of the network path and deviate in another part of the network path. In another embodiment, the different communication channels 110 may represent different concurrently hosted connections on the same network in which performance variations in the communication channels 110 may occur due to differences in the connection protocols or other operating parameters associated with the respective connections.

A set of received data streams 110 are received at a receiver 140. Due to differences in the communication channels 110 and/or differences in the encodings used in different data streams 106, a set of received data streams 110 corresponding to redundant data from the same original data source 102 may arrive at the receiver 110 with different latency and/or quality parameters. Furthermore, the parameters affecting the timing or quality of the received streams on the different channels may change over time based on, for example, movement of the transmitter 120, interference, congestion, or other factors. The receiver 140 selects between received streams 110 corresponding to the same complementary set to generate output streams 112 which may each correspond to one of the original data streams 104. For example, within each complementary set, the receiver 140 may select the received stream 110 arriving with lowest latency. Alternatively, for the set of data streams within a complementary set, the receive may select the received stream 110 having a highest quality metric. In other embodiments, the receiver 140 may select between received streams 110 corresponding to the same complementary set based on different configured optimization criteria.

The described communication system 100 thus streams redundant data over multiple data paths to enable the receiver 140 to select streams according to optimization criteria and to improve overall transmission performance relative to single path communication systems despite variations in network performance. The above-described communication system 100 can be employed in various applications including, for example, vehicle teleoperation, monitoring, or other remote support, robotics applications, or other applications involving communications over wireless networks.

Figure 2:
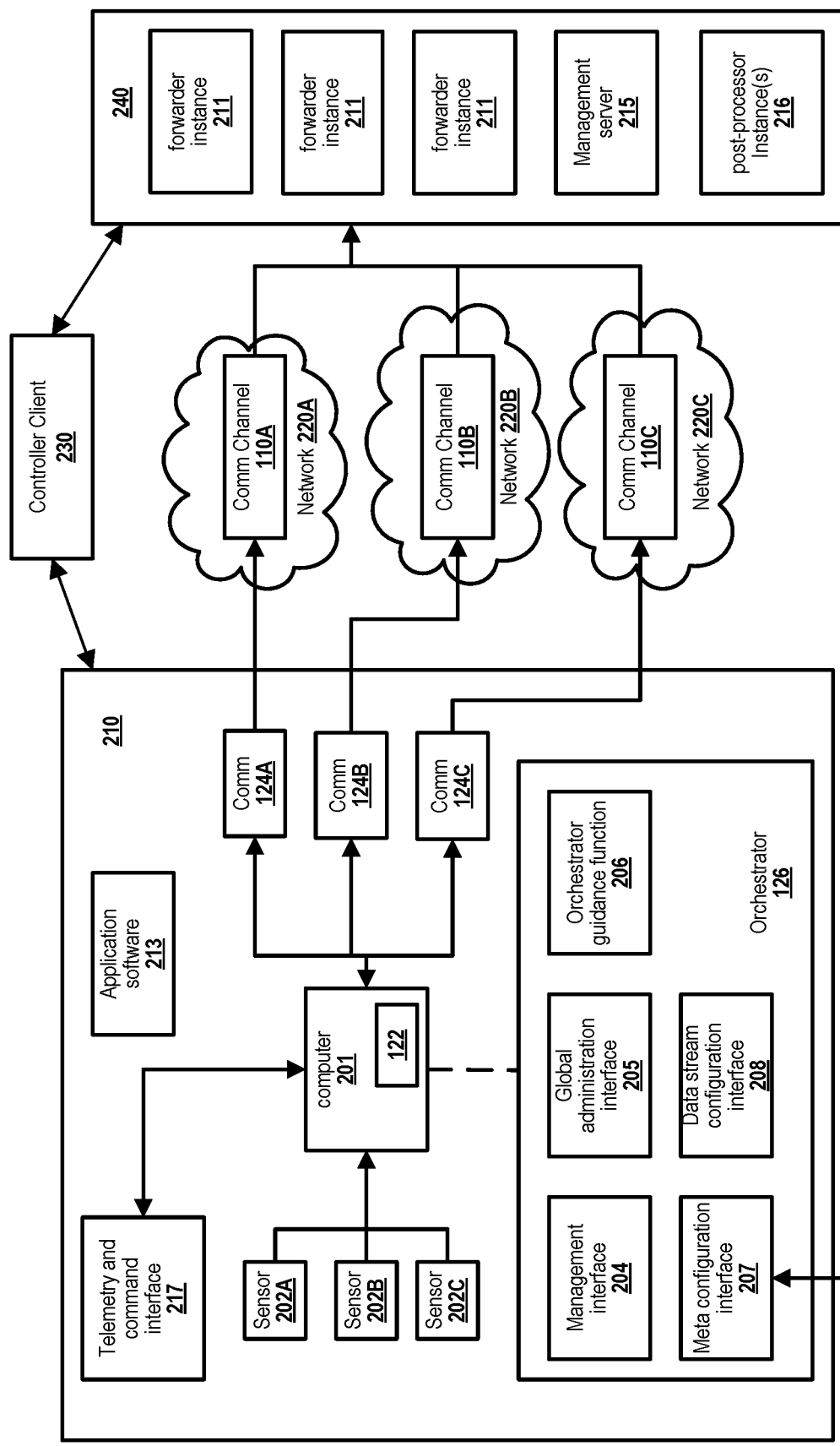
FIG. 2 is a block diagram illustrating an example architecture of a mobile terminal and server platform.

FIG. 2 illustrates an example embodiment of a mobile terminal 210 and a server platform 240 that may communicate over one or more networks 220 (e.g., networks 220A, 220B, 220C) using the above-described redundant multi-path communication technique. In example application, the mobile terminal 210 is implemented in a vehicle system that provides video and/or other telemetry data to the server platform 240 which operates as part of a remote support system for the vehicle. Here, the server platform 240 may provide, or may be coupled to a separate server that provides, teleoperation services, remote monitoring services, or other support services that rely on low latency receipt of the video or other telemetry data from the vehicle in order to provide real-time control or feedback. In alternative applications, the mobile terminal 210 may be implemented, for example, in a robot or other mobile system that receives substantially real-time support or processing performed on the server platform 240.

In an embodiment, the mobile terminal 210 comprises a computer 201 (which includes encoders 122), a sensor array 202 comprising one or more video or infrared cameras, a bidirectional telemetry acquisition and drive-by-wire unit 217, a plurality of communication interfaces 124 (which may be configured for communications over varying types of communication channels including cellular networks, WiFi networks, or LEO communication satellite connections), application software 213 and an orchestrator 126. The server platform 240 partially comprises a plurality of forwarder instances 211, a management server 215, or a plurality of post-processor instances 216 integrated into data stream consumer applications. As explained in further detail below, the forwarder instances 211 operate to forward received data to a downstream client while the post-processor instances 216 process the data streams locally on the server platform 240. A controller client 230 utilized by a controller (such as a fleet manager) may furthermore be coupled to the network 220 to enable communication with the mobile terminal 210 and/or the server platform 240.

Various components of the mobile terminal 210, the controller client 230, and the server platform 240 may be implemented as instructions stored to a storage medium that are executed by a processor to carry out the functions described herein. The server platform 240 may be implemented, for example, as server applications executing on dedicated servers, virtual machines, a cloud platform, or a combination thereof. Components of the server platform 240 may be implemented in a distributed manner such that individual forwarder instances 211 or post-processor instances 216 may run across multiple different virtual environments, bare metal servers, or otherwise distinct execution environments while maintaining real-time data exchange and full information on data streams originating from a single mobile terminal 210.

The sensors 202 each sense data related to an environment of the mobile terminal 210 and generate respective data streams representing the sensed data. For example, in an embodiment, the sensors 202 may each comprise video cameras that generate respective video streams. In the case of a vehicle system, the video cameras may be positioned at different locations on the vehicle to capture different views (e.g., driver view, rear view, side view, etc.) In further embodiments, the sensors 202 may capture other relevant data such as position data, motion data, temperature data, or other types of data.

The computer 201 includes encoders 122 that receives the sensor data streams from the sensors 202, processes the respective streams data streams, and outputs the respective processed streams to the communication interfaces 224 based on an encoding and channel assignment configuration specified by the orchestrator 126. The computer 201 may process the sensor data streams to generate a set of complementary data streams associated with each original sensor data stream and that include redundant data. The set of complementary data streams may comprise direct duplicates of the original sensor stream or may comprise streams encoded according to different encoding schemes or encoding parameters while still representing the same data.

Each of the processed streams may be assigned to one of the communication interfaces 124 for transmitting over a respective communication channel 110, or may be assigned to none of the communication interfaces 124 in the case of a null assignment. As described in further detail below, the orchestrator 126 may make the assignments based on monitored characteristics of the communication channels 110, predicted characteristics of the communication channels 110 that are based on a state of the mobile terminal 210, historical assignments, or other parameters including those derived from machine-learning or simulation techniques. For example, the orchestrator 126 may make the assignments by computing and selecting solutions that provide optimal bandwidth utilization and data stream distribution among the available communication channels in accordance with some optimality criteria. The orchestrator 126 may adjust the assignments depending on changing conditions including changes to performance characteristics of the networks 220 or changes in the position of the mobile terminal 210 that may affect transmission performance due to different levels of network availability, congestion, or environmental obstacles. In an embodiment, the orchestrator 126 provides an application program interface (API) that can be used by the application software 213, the computer 201, or the server platform 240 to control a configuration of the orchestrator 126 and set different optimality criteria. For example, the API may be used by the application software 213 to transmit egress data streams, automatically launch complementary (redundant) copies of these streams, configure encoding and quality parameters of individual complementary streams, and balance the individual complementary streams between available wireless networks as well as switch them on and off in accordance with optimality criteria.

The networks 220 comprises one or more networks 220 that may include a combination of different types of networks (e.g., WiFi, cellular, satellite, etc.). The networks 220 provide multiple communication channels 110 that may each utilize different network types or combinations of network types, different network infrastructure, different operators, or operate according to different parameters as described above such that redundant data streams within a complementary set of data streams transmitted over different communication channels 110 are received at the server platform 240 with different characteristics (e.g., with different latencies, quality, or other characteristics). The networks 220 may at least partially overlap. For example, two or more of the networks 220 may partially share part of the network path and deviate in another part of the network path. Alternatively, a single network 220 may concurrently host multiple communication channels 110 that may have differences in the connection protocols or other operating parameters associated with the respective connections.

A forwarder instance 211 executing on the server platform 240 receives the data streams from the communication channels 110. In an embodiment, the forwarder instance 211 comprises a data stream demultiplexer and forwarder. The forwarder instance 211 identifies the complementary streams corresponding to redundant data originating from the same sensor 202 and selects one of the complementary streams for forwarding to a processing server. For example, the forwarder instance 211 may select the stream that arrives first, the stream with highest quality parameter, or the stream that meets some other predefined parameters or a combination of parameters.

The controller client 230 is a computing device operated by a controller associated with one or more mobile terminals 210. For example, the controller may comprise a fleet operator of a fleet of vehicles or robots that each comprise a mobile terminal 210. The controller client 230 may interface with the orchestrator 126 and/or server platform 240 to enable the controller to provide control configurations of one or more mobile terminals 210 under its control. The controller may control a single mobile terminal 210 or may control a fleet of mobile terminals 210 and coordinate common control strategies between them. For example, the controller may configure the orchestrator 126 to provide orchestration in a manner that is globally coordinated and optimized across a fleet of mobile terminals 210 under control of the controller. Although the controller client 230 is illustrated in FIG. 2 as being coupled through the network 220, in other embodiments, the controller client 230 may be integrated with the mobile terminal 210 or the server platform 240.

In an embodiment, the orchestrator 126 comprises a management interface 204, a global administrative interface 205, an orchestrator guidance function 206, a meta configuration interface 207, and a data stream configuration interface 208.

The programmatic management interface 204 interfaces with the server platform 240 or the controller client 230 to enable an operator to control starting, stopping, configuring and analyzing of egress data streams produced by the sensors 202, reload configuration metadata from a specified sensor 202, update the orchestrator model used by the orchestrator 226, query depth sensors or hardware health monitors, return a status report on the state of the orchestrator 226 or other software subsystems, or invoke other functions.

The globally accessible interface 205 comprises an interface that may be accessed by the platform 240 to instruct the orchestrator 126 to enable communication of the mobile terminal 210 with different forwarder instances 211 or to switch between them. The platform 240 may select new forwarder instances 211 to use based on any number of considerations such as network graph optimality or cost. For example, the platform 240 may invoke a first orchestrator 126 endpoint to transfer a first complementary data stream to a second forwarder instance 211 specified in the invocation, and responsive to receipt of a confirmation that the consumer has been transferred to the second forwarder instance 211 the server platform 240 may invoke a second orchestrator 126 endpoint to transfer a second complementary data stream to a second forwarder instance 211.

The orchestrator guidance function 206 evaluates performance associated with a mapping of the set of data streams to communication channels 110. The output of the evaluation may be utilized to further refine future mappings or to provide feedback to an administrator (e.g., at the controller client 230 or the server platform 240).

The meta configuration interface 207 enables acquisition of metadata 214 from an external source that enables configuration of the orchestrator 126 based on a class of vehicles carrying the mobile terminal 210 that can be derived from the metadata 214. The meta configuration interface 207 may comprise static or configurable paths to files in a file system associated with the computer 201, programmatic calls, or other applicable interface. The vehicle class information may be communicated to the server platform 240 to enable the server platform 240 to determine the vehicle class and to train common models for individual classes that may be applied by the orchestrator 126. For example, the metadata 214 may partially comprise vehicle mass and dimensions, the number of cameras and their mounting height, acceptable deceleration and steering rates, as well as average, maximum, minimum or other aggregate values of such parameters.

The data stream configuration interface 208 initializes metadata describing the array of egress data streams such as their types (for example, video, audio or named numeric telemetry feeds) and controller preferences. For example, the interface 208 may enable the controller of an mobile terminal 210 to configure generic parameters such as minimum and maximum acceptable traffic priority, redundancy level, total latency for each stream, and data-type specific parameters such as minimum and maximum acceptable video resolution and frame rate.

In an embodiment, the orchestrator 126 may implement a constraint in assigning encoded streams to communication channels 110 in which no two initial network legs of paths share the same wireless network infrastructure. For example, paths served by two public land mobile network (PLMN) operators operating sufficiently different (although not necessarily completely non-intersecting) sets of cell towers are considered distinct, while paths served by a PLMN operator and a mobile network virtual operator (MVNO) utilizing the infrastructure provided by that PLMN are considered equivalent. Such a constraint may allow to avoid situations where one or more data sources fail entirely to meet performance requirements caused by a simultaneous failure of two or more of the network paths assigned to its complementary data streams.

In an embodiment, the orchestrator 126 may permit paths with initial wireless network legs and impose restrictions on data streams such that complementary streams are transmitted over different communication channels 110. In an embodiment, a constraint may be imposed such that no two complementary streams are transmitted via the same communication channels 110 that have equivalent wireless networks. In other cases, complementary streams may be transmitted over the same communication channel 110 where they are also redundantly transmitted over different channels 110. In a further embodiment, the orchestrator 126 may implement a method to permit overriding these restrictions responsive to a request by the controller via the controller client 230 or a third party developer.

In an embodiment, when establishing a connection between the mobile terminal 210 and the platform 240, the orchestrator 126 obtains a global IPv6 address by the means of requesting it from an upstream provider or by initializing a Teredo tunnel. The orchestrator 126 may then send an informational packet containing the IPv6 address obtained by the mobile terminal 210 to the platform 240 in order to simplify further communications between the platform 240 and the orchestrator 126.

In an embodiment, instead of or in addition to the orchestrator 126 executing on the mobile terminal 210, one or more support instances of the orchestrator 126 execute on a remote server accessible to the mobile terminal 210. For example, an Internet of Things (IoT) device possessing scarce computational resources and thus incapable of performing the computations required for some functions of the local orchestrator 126 in substantially real time may offload such computations to a support orchestrator instance 126 executing on a proximal computer in a local network.

In an embodiment, the orchestrator 126 may execute a local web server and provide an API to its functions over HTTP, such as in the form of REST API or JSON RPC, over WebSockets or other applicable technologies. Responsive to a web server configuration update by either the controller of a mobile terminal 210 or the operator of the platform 240, the mobile terminal 210 reports the configuration changes to the respective entity providing the update.

In an embodiment the orchestrator 126 executes a local message broker service such as RabbitMQ or Kafka, and partially comprises components subscribing to the appropriate topics in order to process input data and commands from application software 213 or to publish data to application software 213.

In one embodiment the orchestrator 126 may comprise a dynamically linked multi-threaded library with functions designed according to signal/slot architecture implemented using technologies such as Qt or Boost Signals.

In another embodiment the orchestrator 126 may comprise a stand-alone daemon process and a plurality of wrapper libraries for various programming languages and environments; Implementation details of the interaction between the daemon process and the wrappers may vary.

In another embodiment, the orchestrator 126 may create and maintain virtual character devices, named pipes or local sockets as inputs for data streams such as video or telemetry feeds written by application software 213. A software subsystem may subsequently duplicate and send the input data into complementary streams for further processing. This process may be independent of the application software 213.

In another embodiment the orchestrator 126 comprises configuration options to accept and parse character device paths, stream URLs or other similar information required to connect to original data stream generators or subscribe to real-time feeds.

In an embodiment, the orchestrator 126 may comprise a module to generate and store a plurality of configurations for one vehicle class and to assign priority levels to each configuration. Such an approach may be used to train a plurality of orchestrator models, with the orchestrator 126 using a lower priority model as backup responsive to deterioration or considerable difference of the network environment from the expected conditions to a degree which causes a higher priority model to perform inadequately.

In an embodiment, the orchestrator 126 may provide a programmatic interface to configure the expected ingress streams such as command and control channels. Such a configuration may subsequently be translated into an appropriate form and advertised to a forwarder instance 211 associated with a mobile terminal 210 during operation.

In an embodiment, the orchestrator 126 may produce debugging output indicating when a mobile terminal 210 is configured to use two equivalent network paths. For example, the orchestrator 126 may maintain a list of UTRAN IDs of cell towers in a given locality, and use it to establish the rate at which individual wireless networking devices report to be connected to cell towers with identical UTRAN IDs. Responsive to a detection of two or more equivalent network paths assigned to a data stream the orchestrator 126 may inform the controller of the mobile terminal 210 (e.g., via the controller client 230) of a potential misconfiguration.

In an embodiment, optimality criteria and corresponding configurations for an individual data stream or for plurality thereof may be provided by a third-party developer in procedural, declarative, or other applicable form. A third party may update such criteria and configurations over time to reflect changing requirements or other considerations.

In another embodiment, optimality criteria and corresponding configurations for an individual data stream or for plurality thereof may be provided by the server platform 240 in an applicable format. The server platform 240 may compute such criteria and configurations based on large-scale analysis of data streams, and update them over time episodically, periodically or on any applicable basis to reflect improvements in results obtained by machine learning or other analysis methods.

In an embodiment, a forwarder instance 211 instance or a plurality thereof exclusively serve a set of mobile terminals 210 registered to a common controller. For example, the server platform 240 may set up and maintain a separate set of forwarder instances 211 to serve each individual controller in order to simplify network utilization monitoring and billing.

In an embodiment, a forwarder instance 211 may partially comprise a diagnostic subsystem for reporting information such as CPU or RAM load levels or network congestion events. A management server 215 or a plurality thereof may collect such reports and use them as an input for load balancing decisions such as spinning up new forwarder instances 211, spinning down existing forwarder instances 211 or transferring responsibility for mobile terminals 210 between forwarder instances 211 for performance considerations. The reporting and management system 215 may be built according to any appropriate architecture such as a mesh network or a hierarchical structure.

In an embodiment, a forwarder instance 211 may permit a fixed non-zero delay introduction into data streams transmitted from the mobile terminal 210 to create the potential of streaming a higher quality feed. For example, a forwarder instance 211 may manage a video feed that is transmitted as a set of two complementary data streams. The forwarder instance 211 may configure a first stream to provide a lower resolution feed at a higher frame rate and a second stream to provide a higher resolution feed at a lower frame rate.

In an embodiment, a post-processing instance 216 partially comprises data stream demultiplexers and post-processors, and executes alongside or as an integral part of data stream consumers (for example, as a dynamically linked library).

In an embodiment, a post-processor instance 216 may partially comprise an API for integration of a controller-provided feedback function for measuring and rating data stream quality according to arbitrary controller requirements. In an embodiment, the post-processor instance 216 may transmit the results generated by the feedback function as well as additional information to the server platform 240 for further processing in an online manner by streaming or in an offline manner by uploading appropriately prepared packages. For example, such additional information may include the version number of the feedback function or a cryptographic hash of its source code. In an embodiment, the post-processor instance 216 may be integrated with a remote control application or a machine intelligence agent that may execute on the server platform 240 or on a separate server or virtual machine from other components of the server platform 240.

Figure 3:
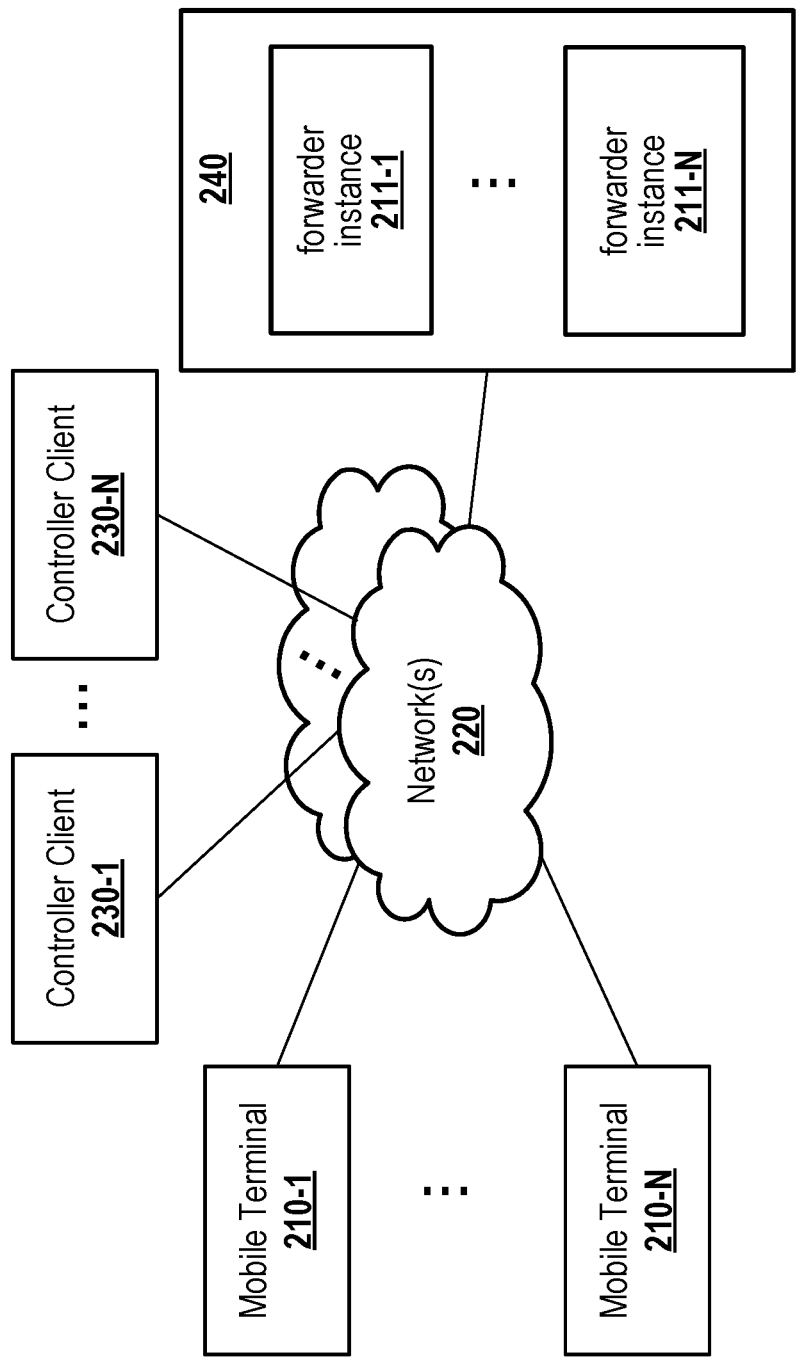
FIG. 3 is an example embodiment of a system for managing communications between a server platform and a plurality of mobile terminals.

FIG. 3 illustrates an example embodiment of an environment in which a server platform 240 manages multiple mobile terminals 210. Different groups of mobile terminals 210 may be controlled by different controllers that may access the mobile terminals 210 under their control via one or more controller clients 230. For each mobile terminal 210, the server platform 240 may determine an optimal processing element (e.g., a physical server, virtual machine, etc.) to execute a forwarder instance 211 assigned to serve that specific mobile terminal 210. The server platform 240 may assign forwarder instances 211 to mobile terminals 210 based on information about the network graph, measurements of the geographic location of the mobile terminal 210, or other data. The server platform 240 may manage the forwarder instances 211, issue instructions to launch a new forwarder instance 211, or issue instructions to transfer responsibility for data streams from different mobile terminals 210 between the forwarder instances 211 according to configured optimization criteria. In a further embodiment, the server platform 240 may perform this determination in advance of real-time streaming based on information received about the velocity, acceleration, steering profile, planned route or other parameters associated with a mobile terminal 210.

In an embodiment, the server platform 240 serves a plurality of mobile terminals 210 controlled by a common controller that may each configure the respective orchestrators 126, and may use an individual learning process for training the models deployed to orchestrators 126 serving its mobile terminals 210. The server platform 240 may implement constraints in the orchestrator 126 in order to impose restrictions on possible orchestration solutions or model architectures that may be trained by individual controllers.

In an embodiment, the server platform 240 may assign mobile terminals 210 to forwarder instances 211 on a one-to-one basis. For example, an individual forwarder instance 211-1 may process all the complementary data streams received from a specific mobile terminal 210-1 but may not serve other mobile terminals 210-2, . . . , 210-N. In another embodiment, the server platform 240 may assign multiple mobile terminals 210 to a forwarder instance 211 on a many-to-one basis. For example, an individual forwarder instance 211-1 may process all the complementary data streams from a plurality mobile terminals 210-1, 210-2, . . . .

In yet other embodiments, the server platform 240 may assign mobile terminals 210 to forwarder instances 211 on a one-to-many or a many-to-many basis. In such an embodiments, complementary data streams from a mobile terminal 210-1 corresponding to a first original data stream may be routed to a first forwarder instance 211-1, and complementary data streams from the mobile terminal 210-1 unit corresponding to a second original data stream may be routed to a second forwarder instance 211-2. In a further embodiment, collections of complementary data streams from multiple mobile terminals 210 may be served by a single forwarder instance 211. For example, a first forwarder instance 211-1 may execute on a computer partially comprising a graphical processing unit (GPU) or a plurality thereof, and a second forwarder instance 211-2 may execute on a computer partially comprising an appropriately programmed Field Programmable Gate Array (FPGA) processor. The server platform 240 may then assign the first forwarder instance 211-1 to processing video streams from multiple mobile terminals 210-1, . . . 210-N and assign the second forwarder instance 211-2 to processing audio streams from multiple mobile terminals 210-1, . . . , 210-N.

In an embodiment, the server platform 240 may comprise a global backend subsystem computing and maintaining the state of a network graph with edge nodes represented by mobile terminals 210 units and data stream consumers. This information may subsequently be used to spin up new forwarder instances 211 at network locations that are computed to possess better network connectivity between a given pair of a mobile terminal 210 and forwarder instance 211. The specific design of the utility function used for this computation may be determined based on considerations such as total network path latency or forwarder instance operation cost.

In an embodiment, the server platform 240 may comprise a global backend subsystem performing large-scale machine learning procedures on the dataset obtained by a plurality of forwarder instances 211. Such a subsystem may also perform committee learning to process individual models trained by multiple controllers.

Figure 4:
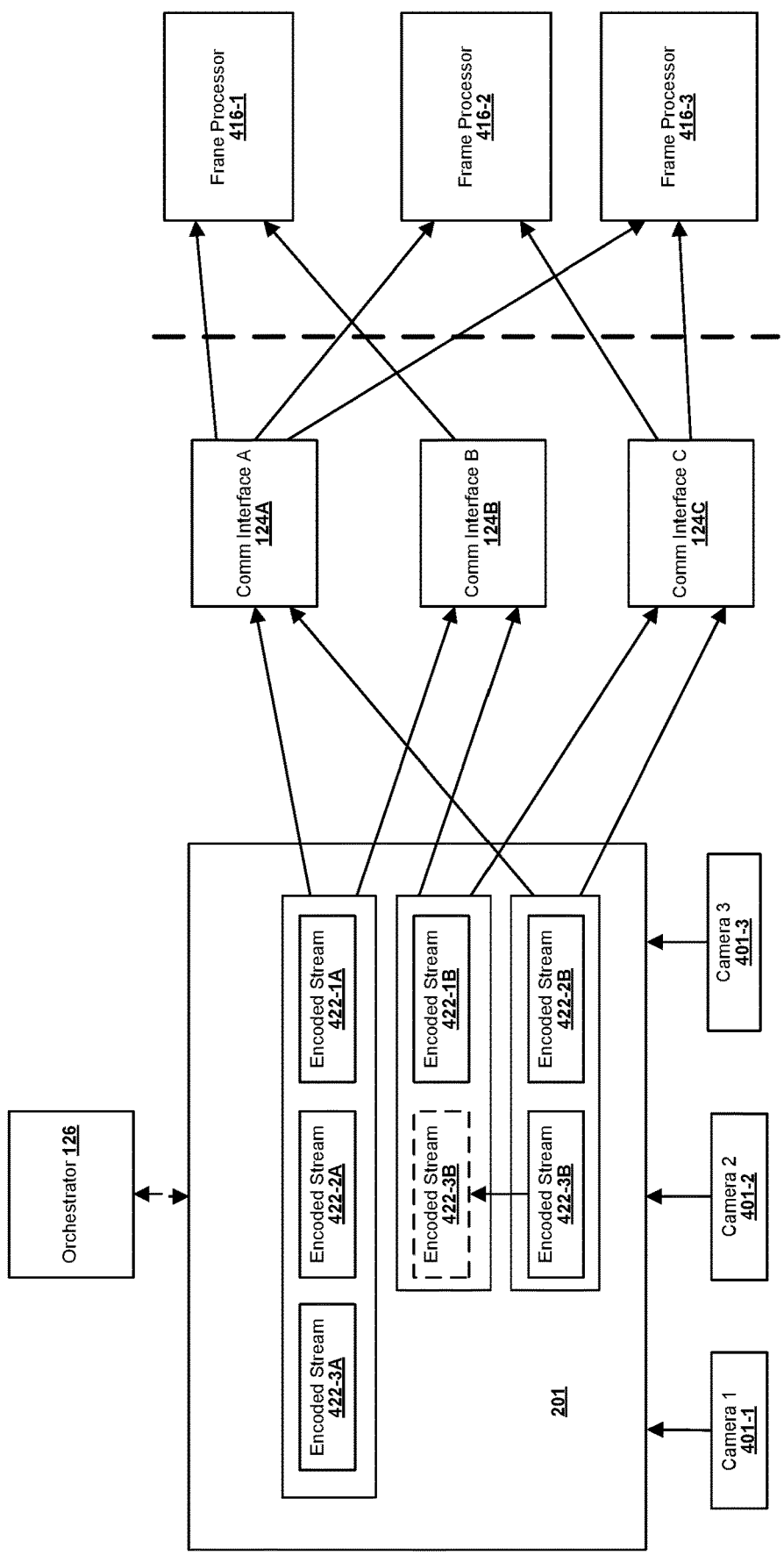
FIG. 4 is an example architecture of a multi-link orchestrated data transmission system.

FIG. 4 illustrates an example of orchestrator function applied to a mobile terminal 210 that includes a plurality of cameras 401-1, 401-2, 401-3 operating as data sources 102. The computer 201 includes encoders that encode the data streams from the cameras 401 to generate sets of mutually complementary (e.g., redundant) streams 422. For example, the computer 201 encode a first data stream from the first camera 401-1 to generate a first complementary set of data streams including encoded stream 422-1A, 422-1B, the computer 201 encode a second data stream from the second camera 401-2 to generate a second complementary set of data streams including encoded stream 422-2A, 422-2B, and the computer 201 encode a third data stream from the third camera 401-3 to generate a third complementary set of data streams including encoded stream 422-3A, 422-3B. The orchestrator 126 assigns each encoded stream 422 to communication channels 124 for transmission to respective frame processors 416 (which operate as post-processing instances 216) at the server platform 240. The frame processors 416 evaluate the received video data and output selected segments to a display device or subsequent video processing device. For example, the frame processors 416 select between the complementary sets of data streams based on time-of-arrival, quality, or other utility function. The selected data streams may be merged into an output stream.

In this example, the orchestrator 126 assigns each encoded stream 422 to multiple communication interfaces 124 for redundancy so that failure of one communication interface 124 (or associated communication channel 110) does not necessarily cause a loss of the data stream 422. For example, in the illustrated embodiment, the orchestrator 126 originally assigns encoded streams 422-1A, 422-2A, 422-3A to be transmitted over communication interfaces 124A and 124B, assigns encoded streams 422-1B to be transmitted over communication interfaces 124B and 124C, and assigns encoded streams 422-2B, 422-3B to be transmitted over communication interfaces 124A and 124C. Here, the orchestrator 126 determines these assignments to optimize some optimization criteria under a constraint that encoded streams 422 in the same complementary set (i.e., derived from the same camera 401) are transmitted using at least two different communication interfaces 124. The frame processors 416 may furthermore each be configured to receive data streams 422 from multiple different communication interfaces 124. In this example, due to the redundant connections, each data stream 422 can be received by each of the frame processors 416. The frame processors 422 demultiplex the complementary streams 422 by selecting between corresponding segments (e.g., a frame or sequence of frames) and make the selected stream available to a client device (e.g., a video processor or video display).

The orchestrator 126 may furthermore update the assignments over time based on monitored network parameters or changes in the state of the mobile terminal 210 (e.g., when the mobile terminal 210 moves to a different location). For example, responsive to detection of deteriorating performance of a network associated with a communication interface 124C and improving performance of network associated with a communication interface 124B, the orchestrator 126 may determine to re-assign the encoded data stream 422-3B from the communication interface 124C and to the communication interface 124B to improve performance while still not violating the constraint of having complementary data streams transmitted over different communication interfaces 124.

Figure 5:
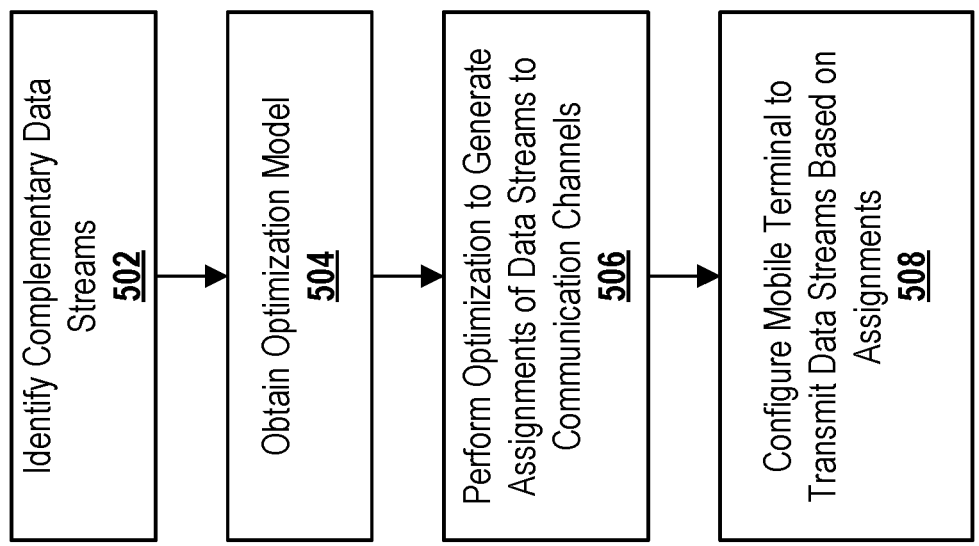
FIG. 5 is a flowchart illustrating an example embodiment of a process for controlling communications over redundant wireless links based on an optimization model.

FIG. 5 illustrates an example embodiment of a process for orchestrating assignments of data streams in a mobile terminal 210 that communicates over respective wireless communication channels 110. The orchestrator 126 identifies 502 a plurality of complementary sets in the data streams that represent redundant data from common data sources. The orchestrator 126 furthermore obtains 504 an optimization model that controls assigning of data streams to communication channels 110. The optimization model may include for example, a constraint that data streams within a complementary set cannot be assigned to the same wireless communication channel and/or may include a utility function for optimizing assignments under different conditions. The orchestrator 126 performs 506 an optimization based on the optimization model. Here, the optimization may be based in part on a detected state of the mobile terminal 210 (e.g., its location), detected parameters associated with the available communication channels 110, or other criteria. The orchestrator 126 then configures 508 the mobile terminal 210 to transmit the data streams over the communication channels 110 in accordance with the assignments. The assignments may be updated periodically or responsive to certain detected events such as a change in the state of the mobile terminal 210 (e.g., when it moves to a different location), loss of connectivity to one or more communication channels 110, drop in bandwidth, or changes to other detected network characteristics.

Figure 6:
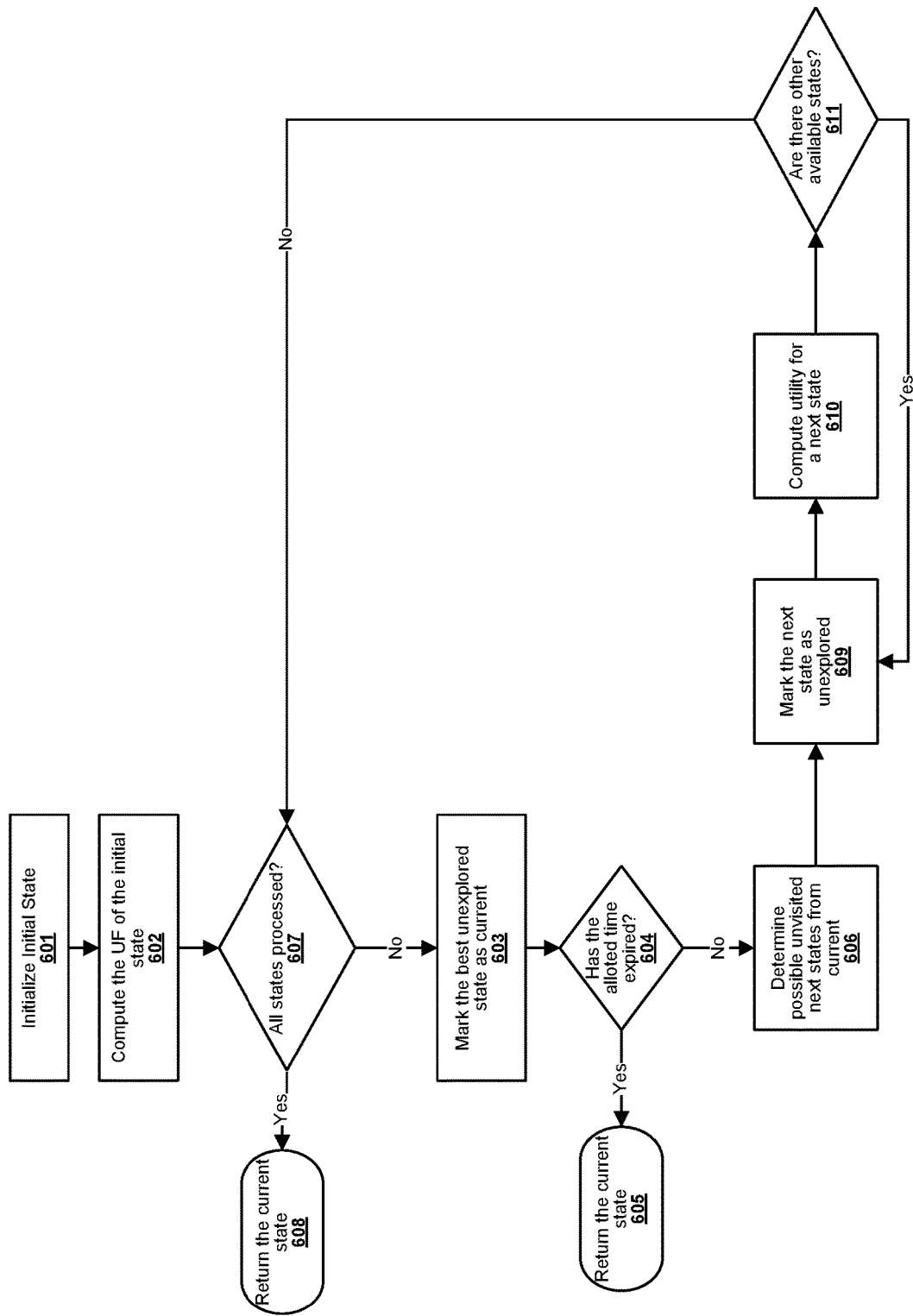
FIG. 6 is a flowchart illustrating an example embodiment of a process for implementing a state search graph of an orchestrator.

FIG. 6 illustrates an example embodiment of a search workflow process performed by the orchestrator 126 to determine an optimal solution for assigning complementary data streams to communication channels. Here, the orchestrator 126 may execute the search process over a space of configuration states described hereinbelow. The search process may use any applicable state of the art search algorithm such as A*, D*, greedy depth-first search or Dijkstra's algorithm. The orchestrator 126 may also communicate the solution in full or in part to the communication interfaces 124, which may then reroute their traffic flows through the appropriate communication channels 110. The orchestrator 126 may execute the search process on a regular basis or responsive to triggering of certain events.

In the illustrated process, the orchestrator 126 begins 601 a search by initializing the root node of a search graph according to an initial search state representing an initial set of configuration parameters and adds the initial state to a list of unexplored states. The orchestrator 126 determines the initial state according to measurements of the network environment, responsive to data acquisition from a database, or generates the initial state using an appropriate function. The initial state for the search may correspond either to a current state or to a future state (in the case that the computations are performed in advance). The orchestrator 126 computes 602 a utility function for the initial state. The orchestrator 126 determines 603 if all possible states have been processed or if there are unexplored states. If all states have been processed, the orchestrator 126 configures 608 the mobile terminal 210 according to the currently selected state (the initial state if the search has just been initialized). Otherwise, the orchestrator 126 selects 603 the node with the best utility function (the initial state if the search has just been initialized) and determines 604 whether the time allocated for the decision-making process has expired. Responsive to expiration of the allocated time, the orchestrator 126 returns 605 the current state. Otherwise, the orchestrator 126 determines 606 a list of possible actions and resulting unexplored states from the currently explored state. Here, the actions represent edges of the search graph that connect a starting state to another state reachable from the starting state by a specific action. Actions may include, for example, assignment of a data stream to a network, stopping transmission of the data stream (e.g., a null assignment), changing a parameter of the data stream encoding (e.g., a video feed resolution), or other action that may affect some operating parameter of the mobile terminal 210. An identified new state resulting from possible actions is marked 609 as unexplored and a utility function is computed 610. The orchestrator 126 then determines if there are additional available states that can be reached from the current state by a different action or combination of actions. If additional states are reachable, the orchestrator marks 509 the state as unexplored, computes a utility function 610, and the process repeats until no further available states are identified. Once all possible states reachable from the current state are identified and their utility functions computed, the orchestrator 126 again determines 607 if all states have been processed. If not, the orchestrator 126 determines which of the currently unexplored states has the highest utility function and marks that state as the current state for continuing through another iteration of the search process. The orchestrator 126 determines if the time allocated for the decision-making process has expired. If it has not expired, the orchestrator 126 performs the next iteration of the search process; otherwise the orchestrator 126 returns the current state.

In an embodiment, the orchestrator 126 represents a state of the mobile terminal 210 possessing 2n dually complementary data streams and k communication channels as a 2n length vector of base (k+1) numbers. Vector element values determine the identifier of the communication channel to which the data stream is assigned. The additional degree of freedom corresponds to the option of assigning a data stream to a null communication channel, i.e. stopping its streaming.

In a further embodiment, the state additionally comprises one or more 2n length vectors determining properties such as quality parameters of each data stream. For example, an element describing the quality level of a video stream may determine the currently set resolution of the camera video feed.

In an embodiment, the utility function of a state comprises two addends $f(s)=g(s)+h(s)$. The first addend $g(s)$ represents costs incurred by a chosen action (such as reassigning a data stream to a different network or changing its quality factor), while the second addend $h(s)$ represents the heuristic function used to rank candidate states.

In an embodiment, the orchestrator 126 computes the heuristic function in the following manner. Let P be the value of a penalty applied to the data stream i in the state s:

$$P_i(s)=B_i^{max}-B(i,s)^{exp}$$

Here $B_i^{max}$ is the practical maximum bandwidth that may be consumed by the data stream i, and $B(i,s)^{exp}$ is the empirically measured bandwidth as provided by the data stream producer. Let $S(j, s)$ be the total penalty incurred on the wireless network j to which m data streams are assigned in the state s: $S(j, s)=\Sigma_{i=1}^{m} P_i(s)$. The total penalty incurred on the null network may be computed as $S(j, s)=\Sigma_{i=1}^{m} B_i^{max}$. The heuristic function then is $h(s)=\Sigma_{j=1}^{k} S(j, s)$; in other words, the heuristic function represents the total bandwidth deficit to which the active data streams are subjected.

In an embodiment, the orchestrator 126 computes the heuristic function $h(s_{d+1})$ of an open state $s_{d+1}$ at the depth level d+1 in a differential manner based on the value of the heuristic function $h(s_d)$ corresponding to the original state $s_d$ at the depth level d to which the state $s_{d+1}$ is immediately connected with a single action affecting the data stream i: $h(s_{d+1})=h(s_d)-P_i(s_d)+P_i(s_{d+1})$. This may allow reduction of the complexity of the heuristic function calculation to O(1).

In an embodiment, the orchestrator 126 constructs and updates the state graph episodically, periodically or responsive to the availability of experimental data acquired by a fleet of mobile terminals 210. For example, a version of the state graph may define a state $s_i(L, M, C)$ as a data point including a localization vector comprised of mobile terminal position, speed, heading and steering angle $L=\{x, y, v, \phi, \theta\}$ or a subset thereof, the map of data stream assignment to communication channels $M=\{r_{ij} \rightarrow d_k k \in[0, m], i \in[1, n], j \in[1,2]\}$, and an array determining data stream configurations $C=\{c_i i \in[1, n]\}$. However, the real-world environment may involve other complex dependencies, and thus the true state $s_i$ may additionally depend on a list of hidden variables $H=\{h_1, h_2 \ldots, h_z\}$ which may be classified as known unknown variables and unknown unknown variables. Subsequently, the orchestrator 126 may be incapable of distinguishing in advance between a set of states $\{s_{ij}(L, M, C, H_j) j \in J\}$ comprised of identical vectors aside from the hidden variable vectors $H_j$. It follows that the orchestrator 126 is capable of distinguishing between the states $\{s_{ij} j \in J\}$ post factum by applying an action Q or a sequence thereof, as otherwise the states can be practically considered a single state. Therefore, in an embodiment the orchestrator 126 may update the state graph by performing posterior analysis of the observed penalties and constructing the sets of states $\{s_{ij}(L, M, C, H_j) j \in J\}$ for all directly observable state identifiers $i \in I$. The orchestrator 126 may compute penalties associated with such ambiguous states as the mathematical expectation of the penalty according to measured probabilities of each state.

In a further embodiment, the orchestrator 126 may episodically or periodically perform filtration of non-persistent features of state graph to remove states that are not observed sufficiently often and are similar enough to some other states to be merged with them. This approach may allow to improve the search algorithm performance, which may be important for a solution that is required to execute in substantial real time. To perform the filtration, the orchestrator 126 may use techniques such as persistent homology, allowing to investigate graph structure at various cut-off weight thresholds.

In another embodiment, the orchestrator 126 may represent the state graph with a hidden Markov model.

In an embodiment, the $B_i^{max}$ values may comprise dynamic variables depending on the geographical coordinates or an equivalent positioning vector of the mobile terminal 210, and a vector T comprising the time since Epoch modulo durations representing periods of diurnal, annual, or other variations, or an equivalent representation of the local time and the day of the year.

In an embodiment, the orchestrator 126 may artificially limit the total number of opened states or the search depth level for performance considerations. For example, the orchestrator 126 may impose a search depth limit imposed manually and statically, or may calculate it in a periodic manner based on the current CPU load. In this case the orchestrator 126 returns the state with the best heuristic function value seen during the search procedure as the search result.

In an embodiment, the orchestrator 126 may impose penalties on individual data channels in order to restrict bandwidth consumption. Exact penalization mechanisms may vary; for example, a video channel may be penalized by limiting the maximum permitted resolution, and an audio channel may be penalized by allowing a higher ratio of dropped frames.

In a further embodiment, the orchestrator 126 may restrict the solution space to a subset of states where the ratio of penalty values for any pair of complementary data channels is limited by a predefined interval RLM 700 determines 706 if the exploration process is complete. If it is not complete, the RLM 700 repeats the simulation a sufficient number of times until a stopping criterion is met.

In a further embodiment, the orchestrator 126 may support an arbitrary number of complementary data streams. For example, a first data stream may be configured to be represented by two complementary streams, and a second data stream may be represented by four complementary streams—for example, to reflect its higher priority level.

In an embodiment, the orchestrator 126 may perform construction of a generalized optimal search tree using bagging methods. The orchestrator 126 may split the accumulated data set into a plurality of distinct segments according to a chosen principle, such as geographic location, and may apply each candidate search tree or its subtrees to a subset of data incorporating a number of items from each segment. The orchestrator 126 may then compare utility function values obtained by candidate search trees to select an optimal tree or subtree that is guaranteed to perform as well as any other across the chosen data sets.

In an embodiment, the orchestrator 126 may perform construction of a generalized optimal search tree using genetic algorithms on the available data set or a subset thereof. In such an embodiment, the orchestrator 126 may generate a plurality of candidate subtrees, link and evaluate them for performance, using subtrees providing better utility function values as a source for the next generation of candidate subtrees. The data set for subtree evaluation may comprise empirical data acquired from platform clients, simulation results, or both.

In an embodiment, the orchestrator 126 may perform aggregation of measurements acquired by third-party developers in order to facilitate generation of orchestrator models on bagged data sets, and merge individual models thus created in an autoML workflow. Prior to merging, the orchestrator 126 may classify models according to metadata such as vehicle type, geographic area of operation or properties of wireless modems and video cameras in use. Furthermore, measurements acquired by third-party developers may be aggregated with additional information acquired from external sources such as databases on cellular tower locations and orientations, topographic maps or population density maps. Dataset-specific models may be included into the master model using techniques such as stacking or boosting.

In an embodiment the orchestrator 126 may support underspecification of input data types by third-party developers and omission of data types included in previously collected data sets and models. The orchestrator 126 may generate a second model omitting one or more data types, and compare it to an existing first model on independent data sets acquired experimentally or using simulations. Responsive to an improvement of modeling quality due to the omission of data types in question, the platform 240 may issue a recommendation to the operator that a subsequent analysis is to be performed to determine scenarios and use cases where the second model may be used to replace the first model.

In an embodiment the orchestrator 126 may support overspecification of input data by third-party developers and inclusion of data types previously not associated with the value of utility function or unavailable in previously collected data sets. The orchestrator 126 may generate a new second model incorporating the new data types, and compare it to a first existing model on independent data sets acquired experimentally or using simulations. Responsive to improvement of modeling quality due to the incorporation of the newly specified data types, the platform 240 may issue recommendations to third-party developers to begin acquisition of these variables to enable replacement of the first model with the second model, conditional on the fact that the newly specified data types are not determined to affect the utility function directly.

In an embodiment, the orchestrator 126 may use evolutionary optimization algorithms for training orchestrator models. For example, such an approach may enable support creation of models or rules as well as hyperparameter selection in a fully automatic mode based on subsets of available models and rules.

In an embodiment, the orchestrator 126 may use Bayesian optimization or Thompson sampling to accelerate decision-making regarding relative importance of input data types to be collected as well as model ensemble parameters and hyperparameters.

In another embodiment the above-described processes may be executed on a management server 215 or other component of the platform 240 instead of on the orchestrator 126.

Figure 7:
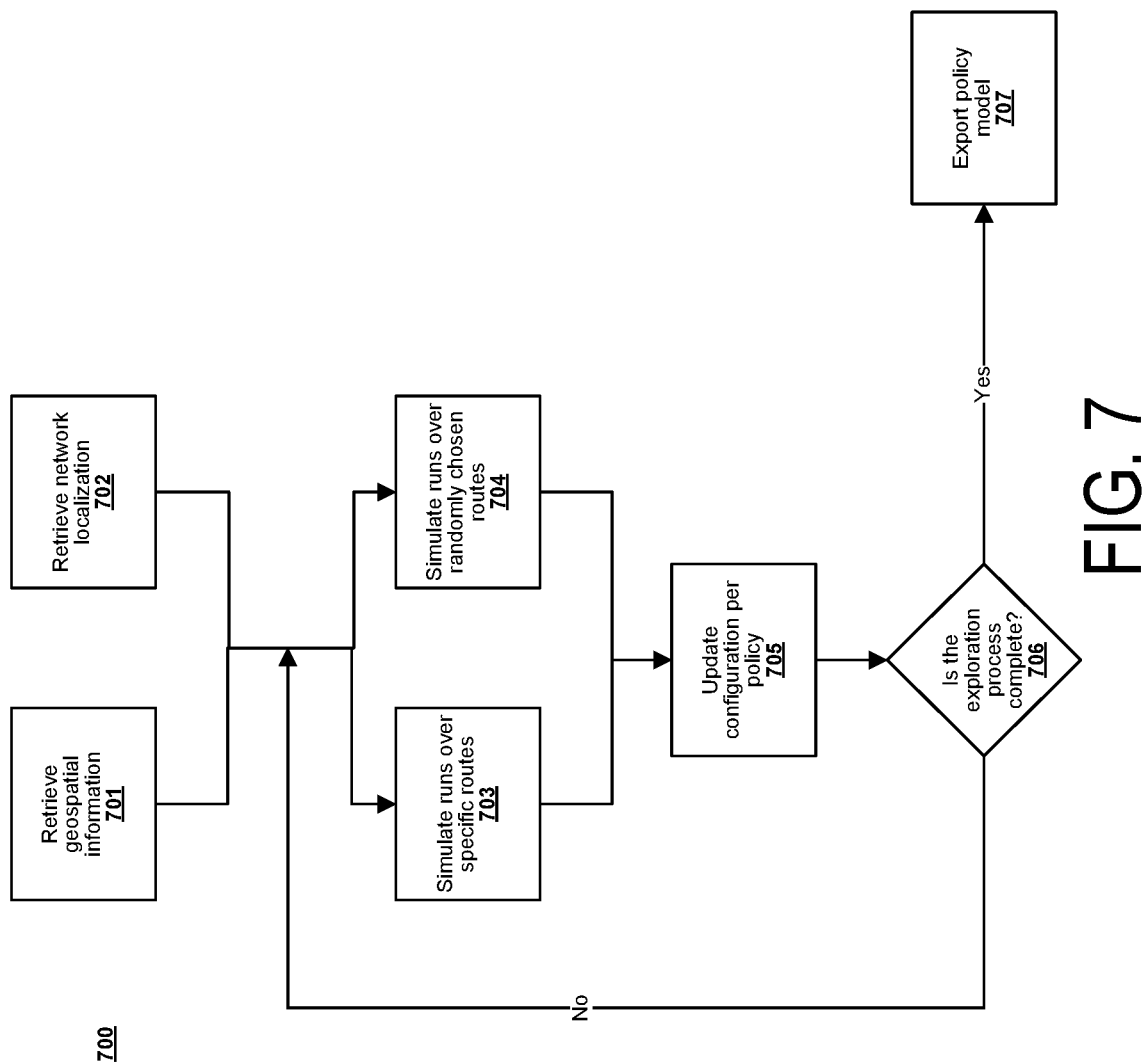
FIG. 7 is a flowchart illustrating an example embodiment of a process for training an orchestrator training based on reinforcement learning.

FIG. 7 illustrates an example embodiment of a process for modeling network performance and generating a policy for an orchestrator 126. The process may be performed by a reinforcement learning module (RLM) 700 that initially trains the orchestrator 126 on a dataset acquired using a wireless environment simulation suite and an urban traffic model simulation. The RLM 700 may execute, for example, on the server platform 240 or on a separate server. For example, the simulation suite may involve a model of mobile terminal 210 equipped with a plurality of communication interfaces $D=\{d_1, d_2, \ldots, d_m\}$ and a plurality of egress data stream generators $G=\{g_1, g_2, \ldots, g_n\}$ producing dually complementary streams $R=\{r_{11}, r_{11}, \ldots, r_{n1}, r_{n2}\}$ controlled by the corresponding configuration variable sets $C=\{c_{11}, c_{12}, \ldots, c_{n1}, c_{n2}\}$. The RLM 700 may partially comprise the SUMO traffic simulator, LENA/ns-3 LTE network simulator, the NS2Mobility middleware package, or any appropriate alternatives thereof. The RLM 700 retrieves 701 geospatial information representing an environment (such as an urban domain), including positions and shapes of obstacles such as hills and buildings. The RLM 700 furthermore retrieves 702 the location and orientation of cellular carrier transmitter nodes or other network infrastructure. The RLM 700 simulations 703 movement of the mobile terminal 210 over a plurality of specific routes (such as routes acquired from the database of routes previously traversed by an actual mobile terminal 210 being simulated), and/or simulates 704 movement of the mobile terminal 210 over a randomly chosen route for a substantial duration of time. The orchestrator 126 may then select an assignment schema of R→D and specific values for C in a manner determined by a comparison of an accepted exploration and exploitation policy. The RLM 700 determines 706 if the exploration process is complete. If it is not complete, the RLM 700 repeats the simulation a sufficient number of times until a stopping criterion is met. Once the exploration process is complete, the RLM 700 to exports 707 a policy module. The policy module may comprise, for example, a tabular rule set or a trained neural network rule set for configuring and assigning data streams in each state corresponding to a road segment under investigation. For example, a state in such a simulation may be determined by the localization vector comprising position, speed, heading and steering angle $\{x, y, v, \phi, \theta\}$ or a subset thereof, the map of data stream assignment to communication devices $\{r_{ij} \rightarrow d_k\ k \in [0, m], i \in [1, n], j \in [1,2]\}$, and data stream configurations $\{c_i i \in [1, n]\}$. Furthermore, an action in such a simulation may be determined by the changes in data stream assignments and configurations: $Q=\{r_{ij} \rightarrow d_l;\ c_t\ \text{st. i}, t \in [1, n], k, l \in [0, m], j \in [1,2], k \neq l, i \neq t\}$. Performing an orchestrator action may be interpreted as altering the course of the mobile terminal 210 in the state space, potentially allowing it to reach a state (S, Q)⇒S' is associated with the prospective ITS localization vector and possessing a lower cost function compared to the state (S,∅)⇒S". The cost function may be chosen as necessary; for example, it may be represented as $F(S, Q)=\sum_{i=1}^{n}(\max(\tau_{th}, \tau(S'))-\tau_{th}(S'))^2+\sum_{i=1}^{n}\sum_{j=1}^{2} B_{ij}^{max}-B_{ij}(S')^{sim}$, where $\tau$ is the total latency of an egress data stream and $\tau_{th}$ is the threshold of allowed latency that does not incur a penalty on the cost function.

In further embodiments, the communication system described herein in FIGS. 1-7 can be employed for communications between a terminal and a server platform (or between a general transmitter and receiver) in which the terminal is not necessarily mobile. For example, in an example embodiment, the mobile terminal may comprise a stationary security camera system that streams video to a server platform over multiple communication channels. An orchestrator assigns complementary data streams to different channels in the same manner as described above, and may dynamically update assignments in response to changes in connectivity, bandwidth, network congestion, or other parameters affecting individual communication channels.

Figure 8:
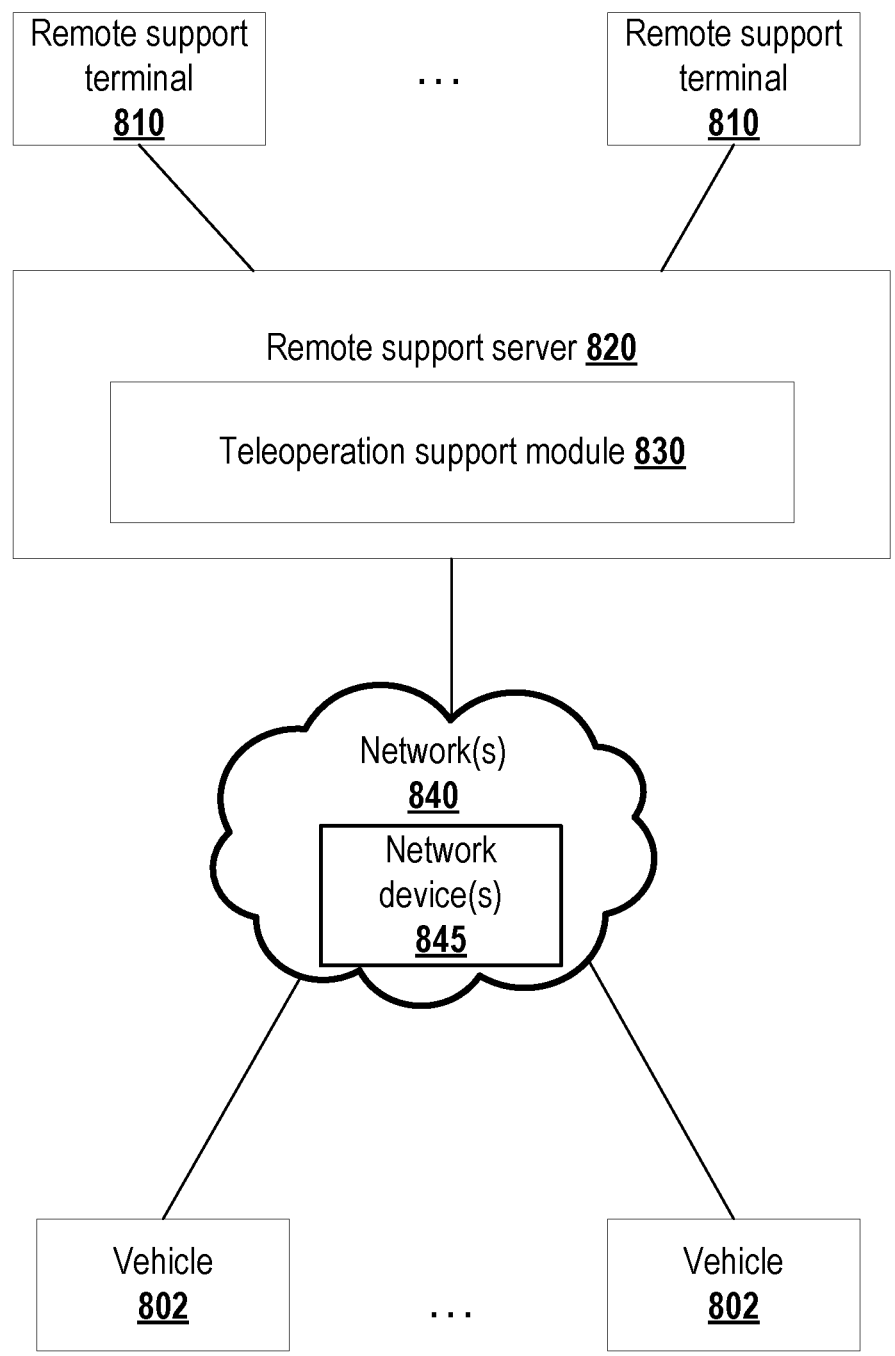
FIG. 8 is an example embodiment of a remote support environment for providing remote support to a vehicle.

FIG. 8 illustrates a block diagram of a vehicle environment 800 for a teleoperation or other remote support application in which the described low latency multi-path communication system may be used. The vehicle environment 800 includes a plurality of vehicles 802, a remote support server 820 coupled to one or more remote support terminals 810, and one or more networks 840 comprising network devices 845. Here, for example, the described mobile terminal 210 may be integrated with the vehicle 802 and the described server platform 240 may be integrated with the remote support server 820. For providing video or other telemetry data from the vehicle 802 to the remote support server 820 the vehicle 802 may operate as a transmitter 120 while the remote support server 820 operates as a receiver 140. For transmitting control data from the remote support server 820 to the vehicle 802, the remote support server 820 may operate as a transmitter 120 and the vehicle 802 may operate as a receiver 140. In alternative embodiments, the vehicle environment 800 may include different or additional components.

The vehicle 802 comprises a land vehicle (e.g. a car or truck), a seaborne vehicle, a subterranean vehicle, an airborne vehicle, or other vehicle. The vehicle 802 can include, for example, a transport vehicle for transporting passengers or cargo, a surveillance vehicle (e.g., a unmanned aerial vehicle or drone), an operational vehicle such as a forklift or other container yard vehicle, an agricultural vehicle such as a tractor, or any other type of vehicle or robot that can move through an environment. The vehicle 802 may comprise an intelligent transport system (ITS) that connects to one or more networks 840 and communicates with one or more entities via the one or more networks 840 (e.g., the remote support server 820 and/or other vehicles 802) to enable the vehicle 802 to obtain information useful to safe navigation of an environment. In an embodiment, the vehicle 802 may comprise an autonomous or semi-autonomous vehicle that includes an autonomous driving system that automatically controls navigation based on sensed environment conditions. Alternatively, the vehicle 802 may comprise a non-autonomous vehicle that relies on control inputs from a driver in the vehicle 802 or from the remote support server 820. In the case of teleoperation, the vehicle 802 wirelessly receives control inputs via the one or more networks 840 that control various components of the drive system such as the steering system, acceleration, braking, etc. The vehicle 802 may also comprise various sensors such as optical or infrared cameras, ranging devices such as LIDAR, sonar or radar units, other sensor types allowing real-time acquisition of data on the vehicle environment 800, vehicle 802 components and occupants, that capture image data and other environmental data that may be streamed over one or more networks 840 to a remote support server 820 or to other vehicles 802.

The vehicle 802 may depend on a reliable network connection for streaming video or other sensor data to the remote support server 820 and for receiving control inputs or data used by the vehicle 802 to navigate in a safe and efficient manner. For example, to provide teleoperation support to a vehicle 802, it is important that the video stream is received at the remote support server 820 in real-time with a latency as low as possible. Therefore, the vehicle may maintain multiple simultaneous connections over the same or different networks to optimize its connectivity using the multipath communication techniques described above.

The remote support server 820 includes a teleoperation support module 830 that may be implemented as one or more non-transitory computer-readable storage mediums that stores instructions executed by one or more processors to perform the functions attributed herein. In an embodiment, the teleoperation support module 830 communicates with a vehicle 802 to provide teleoperation or other support services in instances when extra assistance is desired. For example, the vehicle 802 may request teleoperation assistance from the teleoperation support module 830 when one or more vehicle sensors fail, when an unknown problem occurs with the vehicle's autonomous driving software, when the vehicle 802 encounters a barrier or other hazardous road conditions, or when a passenger manually requests remote assistance. Furthermore, the teleoperation support module 830 may provide teleoperation support when the vehicle 802 enters a geographic region where it is not legally permitted to operate in a completely autonomous way.

In an embodiment, upon requesting remote support, a video stream capturing the vehicle environment may be provided by the vehicle 802 to the teleoperation support module 830 and presented at a remote support terminal 810. A human teleoperator at the remote support terminal 810 may view the video stream on a display to assess the situation and take appropriate action via a control input device at the remote support terminal 810. In this embodiment, the teleoperation support module 830 may present real-time video streamed from the vehicle 802 to a display of the remote support terminal 810 and may provide real-time control data to the vehicle 802 received via the remote support terminal 810 to enable the teleoperator remotely drive the vehicle 802.

In another embodiment, the teleoperation support module 830 may comprise an artificial intelligence agent that does not necessarily require a remote support terminal 810 with a display or physical controls for providing human input. Here, the teleoperation support module 830 may provide control instructions to the vehicle 802 directly based on the processing of a real-time video feed and other sensor data streamed to the teleoperation support module 830 from the vehicle 802 without necessarily utilizing any human input.

The remote support terminals 810, if present, may be coupled to the remote support server 820 via a local area network connection, a direct wired connection, or via a remote connection through the network 840. A remote support terminal 810 may include a display to enable a human teleoperator to view real-time video of the vehicle environment and controls for enabling a human teleoperator to control the vehicle. In an embodiment, the video may include at least a front view that mimics or approximates the view seen by a driver within the vehicle 802. Optionally, the video may include additional views, such as a rear view video, side view videos, or other views that may mimic the views seen by a driver in mirrors of a traditional vehicle or may include other views not necessarily available to a driver of a traditional vehicle. The controls may include controls that mimic those available within a traditional vehicle such as a steering wheel, acceleration pedal, and brake pedal. Alternatively, different forms of controls may be available at the remote terminal 810 such as a joystick, mouse, touch screen, voice control system, gesture control system, or other input mechanism to control one or more aspects of the vehicle 802.

In other embodiments, where the teleoperation support module 830 operates entirely as an artificial intelligence agent without human intervention, the remote support terminals 810 may be omitted.

In further embodiments, where the remote support server 820 may provide other forms of remote support that do not necessarily involve direct teleoperation, parts of the remote support terminal 810 and the teleoperation support module 830 may be omitted. For example, the remote support server 820 may enable remote monitoring without necessarily providing control or remote assistance in which a remote operator provided verbal or message-based information that enables a human driver or automated drive system of the vehicle to make control decisions. In other embodiments, the remote support server 820 may provide limited control functions such as causing the vehicle 802 to brake or shut off without being able to control other functions such as steering or acceleration.

The plurality of networks 840 represents the communication pathways between the vehicles 802, the remote support terminals 810, and the remote support server 820. In one embodiment, the networks 840 use standard communications technologies and/or protocols and can include the Internet. In another embodiment, the entities on the networks 840 can use custom and/or dedicated data communications technologies. The plurality of networks 840 may comprise networks of different types such as, for example, a public cellular connection (e.g., 4G or 5G), a dedicated or private wireless network (e.g., WiFi), a low-latency satellite uplink, VANET wireless channels (including vehicle-to-vehicle or vehicle-to-infrastructure links), or any combination thereof. Furthermore, the plurality of networks 840 may include multiple networks of the same type operated by different service providers. For example, the networks 840 may include two or more different cellular networks operated by different cellular carriers, having different network parameters, and having different physical infrastructure. Additionally, the networks may include two more WiFi networks operating with different network parameters and/or different network infrastructure. The network devices 845 may include cell towers, routers, switches, LEO satellite uplink devices, WiFi hotspot devices, VANET devices, or other components that provide network services to the entities connected to the plurality of networks 840. The network devices 845 may be integrated into roadside infrastructure units that are integrated with traffic devices or other roadside systems. The network devices 845 may have varying capabilities and may be spread over a wide geographic area. Thus, different allocations of network resources may be available to vehicles 802 in different locations at different times depending on environmental factors, the capabilities of different network devices 845, and network congestion in the area where each vehicle 802 is located.

In an embodiment, the network 840 can include peer-to-peer connections between the vehicle 802 and the remote support server 820 or directly with a remote support terminal 810. Here a server on the network 840 may provide some minimal handshaking to establish the connection and data may then be transmitted to and from the vehicle 802 using a peer-to-peer connection that operates with low latency.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware or hardware, and when embodied in software, could be downloaded to reside on and be operated from different platforms used by a variety of operating systems. The embodiments can also be in a computer program product which can be executed on a computing system.

The embodiments also relate to an apparatus for performing the operations herein. This apparatus may be specially constructed for the purposes, e.g., a specific computer, or it may comprise a computer selectively activated or reconfigured by a computer program stored in the computer. Such a computer program may be stored in a computer readable storage medium, such as, but is not limited to, any type of disk including floppy disks, optical disks, CD-ROMs, magneto-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for disclosure of enablement and best mode.

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of embodiments. This description should be read to include one or at least one and the singular also includes the plural unless it is obvious that it is meant otherwise. The use of the term and/or is intended to mean any of: "both", "and", or "or."

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments.

The invention claimed is:

1. A method for determining assignments of data streams in a mobile terminal to wireless communication channels, the method comprising:
obtaining geospatial information relating to objects along a route of the mobile terminal;
obtaining network infrastructure information relating to locations of wireless communication infrastructure along the route;
performing a simulation of movement of the mobile terminal through the route and predicting wireless communication performance parameters of the wireless communication channels based on the geospatial information and the network infrastructure information;
storing a mapping of the wireless communication performance parameters to locations along the route based on the simulation;
identifying a plurality of complementary sets of data streams, wherein the data streams within a complementary set represent redundant data from a common data source;
obtaining an optimization model for optimizing, based on the mapping, the assignments of data streams to the wireless communication channels, the optimization model enforcing a constraint that data streams within a complementary set are assigned to at least two different wireless communication channels;
performing an optimization based on the optimization model to determine the assignments;
configuring the mobile terminal to transmit the data streams over the wireless communication channels in accordance with the assignments; and
transmitting the data streams over the wireless communication channels to a platform server.

2. The method of claim 1, further comprising:
responsive to a change in state of the mobile terminal, updating the optimization to determine updated assignments; and
re-configuring the mobile terminal based on the updated assignments.

3. The method of claim 1, further comprising:
responsive to a change in parameters of the wireless communications channels, updating the optimization to determine updated assignments; and
re-configuring the mobile terminal based on the updated assignments.

4. A method for determining assignments of data streams in a terminal to wireless communication channels, the method comprising:
identifying a plurality of complementary sets of data streams, wherein the data streams within a complementary set represent redundant data from a common data source;
obtaining an optimization model for optimizing the assignments of data streams to the wireless communication channels, the optimization model including a utility function and the optimization model enforcing a constraint that data streams within a complementary set are assigned to at least two different wireless communication channels;
generating a search graph with nodes representing a plurality of states of the terminal and edges representing actions for transitioning between the states;
for each of the states, computing a value of the utility function that represents predicted wireless communication performance of the terminal in each of the states;
determining an optimized state of the terminal that optimizes the value of the utility function; and generating the assignments based on the optimized state;
configuring the terminal to transmit the data streams over the wireless communication channels in accordance with the assignments; and
transmitting the data streams over the wireless communication channels to a platform server.

5. A method for determining assignments of data streams in a terminal to wireless communication channels, the method comprising:
identifying a plurality of complementary sets of data streams, wherein the data streams within a complementary set represent redundant data from a common data source;
obtaining an optimization model for optimizing the assignments of data streams to the wireless communication channels, the optimization model enforcing a constraint that data streams within a complementary set are assigned to at least two different wireless communication channels,
wherein obtaining the optimization model comprises applying a reinforcement learning model that trains an orchestrator of the terminal on a dataset acquired based on a simulation of the terminal moving through a wireless communication environment;
performing an optimization based on the optimization model to determine the assignments;
configuring the terminal to transmit the data streams over the wireless communication channels in accordance with the assignments; and
transmitting the data streams over the wireless communication channels to a platform server.

6. The method of claim 1, wherein performing the optimization comprises optimizing for lowest latency or highest quality of service.

7. The method of claim 1, wherein obtaining the optimization model comprises receiving a configuration from the platform server via an application programming interface of an orchestrator of the terminal.

8. A non-transitory computer-readable storage medium storing instructions for determining assignments of data streams in a mobile terminal to wireless communication channels, the instructions when executed by a processor causing the processor to perform steps comprising:
obtaining geospatial information relating to objects along a route of the mobile terminal;
obtaining network infrastructure information relating to locations of wireless communication infrastructure along the route;
performing a simulation of movement of the mobile terminal through the route and predicting wireless communication performance parameters of the wireless communication channels based on the geospatial information and the network infrastructure information;
storing a mapping of the wireless communication performance parameters to locations along the route based on the simulation;
identifying a plurality of complementary sets of data streams, wherein the data streams within a complementary set represent redundant data from a common data source;
obtaining an optimization model for optimizing, based on the mapping, the assignments of data streams to the wireless communication channels, the optimization model enforcing a constraint that data streams within a complementary set are assigned to at least two different wireless communication channels;
performing an optimization based on the optimization model to determine the assignments;
configuring the mobile terminal to transmit the data streams over the wireless communication channels in accordance with the assignments; and
transmitting the data streams over the wireless communication channels to a platform server.

9. The non-transitory computer-readable storage medium of claim 8,
the instructions when executed further causing the processor to perform steps including:
responsive to a change in state of the mobile terminal, updating the optimization to determine updated assignments; and
re-configuring the mobile terminal based on the updated assignments.

10. The non-transitory computer-readable storage medium of claim 8,
the instructions when executed further causing the processor to perform steps including:
responsive to a change in parameters of the wireless communications channels, updating the optimization to determine updated assignments; and
re-configuring the mobile terminal based on the updated assignments.

11. A non-transitory computer-readable storage medium storing instructions for determining assignments of data streams in a terminal to wireless communication channels, the instructions when executed by a processor causing the processor to perform steps comprising:
identifying a plurality of complementary sets of data streams, wherein the data streams within a complementary set represent redundant data from a common data source;
obtaining an optimization model for optimizing the assignments of data streams to the wireless communication channels, the optimization model including a utility function and the optimization model enforcing a constraint that data streams within a complementary set are assigned to at least two different wireless communication channels;
generating a search graph with nodes representing a plurality of states of the terminal and edges representing actions for transitioning between the states;
for each of the states, computing a value of the utility function that represents predicted wireless communication performance of the terminal in each of the states;
determining an optimized state of the terminal that optimizes the value of the utility function; and
generating the assignments based on the optimized state;
configuring the terminal to transmit the data streams over the wireless communication channels in accordance with the assignments; and
transmitting the data streams over the wireless communication channels to a platform server.

12. A non-transitory computer-readable storage medium storing instructions for determining assignments of data streams in a terminal to wireless communication channels, the instructions when executed by a processor causing the processor to perform steps comprising:
identifying a plurality of complementary sets of data streams, wherein the data streams within a complementary set represent redundant data from a common data source;
obtaining an optimization model for optimizing the assignments of data streams to the wireless communication channels, the optimization model enforcing a constraint that data streams within a complementary set are assigned to at least two different wireless communication channels,
wherein obtaining the optimization model comprises applying a reinforcement learning model that trains an orchestrator of the terminal on a dataset acquired based on a simulation of the terminal moving through a wireless communication environment;
performing an optimization based on the optimization model to determine the assignments;
configuring the terminal to transmit the data streams over the wireless communication channels in accordance with the assignments; and
transmitting the data streams over the wireless communication channels to a platform server.

13. The non-transitory computer-readable storage medium of claim 8, wherein
performing the optimization comprises optimizing for lowest latency or highest quality of service.

14. The non-transitory computer-readable storage medium of claim 8,
wherein obtaining the optimization model comprises receiving a configuration from the platform server via an application programming interface of an orchestrator of the terminal.

15. The method of claim 4, further comprising:
responsive to a change in state of the terminal, updating the optimization to determine updated assignments; and
re-configuring the terminal based on the updated assignments.

16. The method of claim 4, further comprising:
responsive to a change in parameters of the wireless communications channels, updating the optimization to determine updated assignments; and
re-configuring the terminal based on the updated assignments.

17. The method of claim 5, further comprising:
responsive to a change in state of the terminal, updating the optimization to determine updated assignments; and
re-configuring the terminal based on the updated assignments.

18. The method of claim 5, further comprising:
responsive to a change in parameters of the wireless communications channels, updating the optimization to determine updated assignments; and
re-configuring the terminal based on the updated assignments.

19. The non-transitory computer-readable storage medium of claim 11, the instructions when executed further causing the processor to perform steps including:
responsive to a change in state of the terminal, updating the optimization to determine updated assignments; and
re-configuring the terminal based on the updated assignments.

20. The non-transitory computer-readable storage medium of claim 11, the instructions when executed further causing the processor to perform steps including:
responsive to a change in parameters of the wireless communications channels, updating the optimization to determine updated assignments; and
re-configuring the terminal based on the updated assignments.

21. The non-transitory computer-readable storage medium of claim 12, the instructions when executed further causing the processor to perform steps including:
responsive to a change in state of the terminal, updating the optimization to determine updated assignments; and
re-configuring the terminal based on the updated assignments.

22. The method of claim 4, wherein the terminal comprises a mobile terminal, and wherein the optimization model is derived from a simulation of the mobile terminal moving through an environment and information describing available network infrastructure in the environment.

23. The non-transitory computer-readable storage medium of claim 11, wherein the terminal comprises a mobile terminal, and wherein the optimization model is derived from a simulation of the mobile terminal moving through an environment and information describing available network infrastructure in the environment.

* * * * *